United States Patent [19]

Matsushima

[11] Patent Number: 5,450,548
[45] Date of Patent: Sep. 12, 1995

[54] APPARATUS FOR PERFORMING DATA TRANSFER SYNCHRONOUSLY OR ASYNCHRONOUSLY BETWEEN DEVICE CHANNELS

[75] Inventor: Hitoshi Matsushima, Kawasaki, Japan

[73] Assignee: Fujitsu Limited, Kawasaki, Japan

[21] Appl. No.: 330,117

[22] Filed: Oct. 27, 1994

Related U.S. Application Data

[63] Continuation of Ser. No. 138,892, Oct. 19, 1993, abandoned, which is a continuation of Ser. No. 846,280, Mar. 4, 1992, abandoned.

[30] Foreign Application Priority Data

Mar. 7, 1991 [JP] Japan ................... 3-041649

[51] Int. Cl.$^6$ ............................................. G06F 13/00
[52] U.S. Cl. ........................ 395/250; 395/872; 395/878; 364/239.1; 364/239.8; 364/DIG. 1
[58] Field of Search ......................... 395/250, 275

[56] References Cited

U.S. PATENT DOCUMENTS

| | | | |
|---|---|---|---|
| 4,060,849 | 11/1977 | Bienvenu et al. | 364/200 |
| 4,095,267 | 6/1978 | Morimoto | 364/200 |
| 4,263,650 | 4/1981 | Bennett et al. | 364/200 |
| 4,407,016 | 9/1983 | Bayliss et al. | 364/200 |
| 4,463,443 | 7/1984 | Frankel et al. | 364/900 |
| 4,514,824 | 4/1985 | Loskorn et al. | 364/900 |
| 4,586,189 | 4/1986 | Tyrrell | 375/117 |
| 4,665,483 | 5/1987 | Ciacci et al. | 364/200 |
| 4,716,525 | 12/1987 | Gilanyi et al. | 364/200 |
| 4,754,399 | 6/1988 | Yamamoto et al. | 364/200 |
| 4,815,034 | 3/1989 | Mackey | 364/900 |
| 4,825,357 | 4/1989 | Ovies et al. | 364/200 |
| 4,958,304 | 9/1990 | Moore | 364/521 |
| 4,965,801 | 10/1990 | DuLac | 364/200 |
| 5,031,091 | 7/1991 | Wakatsuki et al. | 364/200 |
| 5,121,480 | 6/1992 | Bonke et al. | 395/250 |
| 5,187,779 | 2/1993 | Jeddeloh et al. | 395/250 |

FOREIGN PATENT DOCUMENTS 5155810 10/1992 Japan ........................... 395/250

OTHER PUBLICATIONS

Balue et al., "Data-Transfer Speed Extracts Mileage from 5.2-Gbyte Tape", *Electronic Design International*, vol. 35, No. 25, 29 Oct. 1987, pp. 95-99.

"Two-Way Data Flow Interface Circuit to Increase Computer Processing Throughput", *IBM Technical Disclosure Bulletin*, vol. 32, No. 5A, Oct. 1989, pp. 120-122.

Beukema et al. "Transparent Mode in an I/O Controller", *IBM Technical Disclosure Bulletin*, vol. 26, No. 11, Apr. 1984, pp. 5956-5959.

*Primary Examiner*—Christopher B. Shin
*Attorney, Agent, or Firm*—Greer, Burns & Crain, Ltd.

[57] ABSTRACT

A data transfer system in a device control apparatus for controlling data transfer between a channel of a central processing unit and a device, comprising: a channel transfer circuit for transferring data to the channel and for receiving data from the channel; a device transfer circuit for transferring data to the device and for receiving data from the device, and an intermediate memory for temporarily storing transfer data from the channel or from the device transfer circuit only when the transfer rate determined by the channel is different from the transfer rate determined by the device.

3 Claims, 13 Drawing Sheets

Fig. 10B (WHEN CHANNEL TRANSFER RATE IS HIGHER THAN DISK TRANSFER RATE)

$T1 < T2$ $\tau 1 >> \tau 2$

APPARATUS FOR PERFORMING DATA TRANSFER SYNCHRONOUSLY OR ASYNCHRONOUSLY BETWEEN DEVICE CHANNELS

This is a continuation of application Ser. No. 08/138,892, filed on Oct. 19, 1993, now abandoned, which is a continuation of application Ser. No. 07/846,280, filed Mar. 4, 1992, now abandoned.

BACKGROUND OF THE INVENTION

1. Field of the Invention

The present invention relates to a data transfer system in a device control apparatus for performing data transfer between a channel of a master device and a slave device such as a disk drive.

2. Description of the Related Art

In recent years, the difference in transfer capacities between channel interfaces between a CPU and a disk control apparatus and between the disk control apparatus and a disk device has been expanding. Therefore, it has been required to provide a data transfer system in which a synchronous transfer system for the same transfer rates and an asynchronous transfer system via a buffer for different transfer rates are properly combined.

In the conventional disk sub-system, there are various large and small combinations between channel transfer rates and disk transfer rates. In recent years, the difference of transfer capacities between channel interfaces and device interfaces has been expanding.

For instance, in an optical channel interface, transfer rate of 10 MB/s has been achieved. In contrast, the disk drives have transfer rates of 4.5 M B/s at the highest.

In order to accommodate such a difference in transfer capacities of such channels and disk drives to extract 100% of the transfer capacity of the channels, there has been proposed an asynchronous transfer system for performing a reading and writing operation through a data buffer in the disk control apparatus.

The asynchronous transfer system for transferring data through a buffer has a large overhead for each process. Namely, for each command of writing or reading, a preparation process and an ending process are necessary for writing and reading data to and from the buffer. The asynchronous transfer system, however, is advantageous when the transfer rates of the channel and the disk device are largely different, because the degradation of performance due to the overhead will not become significant by efficient use of the channel when it is free during the overhead process. Conversely, when the transfer rates of the channel and the disk device are almost the same, the asynchronous transfer system is not preferable because the overhead causes a delay, and the synchronous transfer system is preferable in this case.

SUMMARY OF THE INVENTION

In view of the problem in the prior art, it is an object of the present invention to provide a data transfer system in a device control apparatus, in which the most efficient data transfer is possible by switching or combining a synchronous transfer path and an asynchronous transfer path depending upon a difference in the transfer capacities between a channel and a device such as a disk drive.

To attain the above object, there is provided, according to the present invention, a data transfer system in a device control apparatus disposed between a channel of a central processing unit and a device, for controlling data transfer between the channel and the device. The data transfer system according to the present invention comprises a channel transfer circuit, operatively connected to the channel, for transferring data to the channel and for receiving data from the channel; a device transfer circuit, operatively connected to the channel transfer circuit, for transferring data to the device and for receiving data from the device; and an intermediate memory, operatively connected to the channel transfer circuit and to the device transfer circuit, for temporarily storing transfer data from the channel or from the device transfer circuit, only when the transfer rate determined by the channel is different from the transfer rate determined by the device.

According to an aspect of the present invention, when the transfer rate determined by the channel is the same as the transfer rate determined by the device, the data is directly transferred between the channel transfer circuit and the device without passing through the intermediate memory.

According to another aspect of the present invention, the device control apparatus is disposed between the channel of the central processing unit and a plurality of devices, and the channel transfer circuit comprises: an information memory for storing data of the transfer rate determined by the channel and data of the transfer rates determined by the devices; and a switching circuit for comparing the transfer rate determined by the channel and the transfer rate determined by the device read out from the information memory in response to a transfer request from the central processing unit, so as to select a synchronous transfer path that does not pass through the intermediate memory when the transfer rates are coincident, and to select an asynchronous transfer path through the intermediate memory when the transfer rates are not coincident.

According to still another aspect of the present invention, the switching circuit selects the asynchronous transfer path when the transfer rate determined by the channel is higher than the transfer rate determined by the device or when the transfer rate determined by the channel is lower than the transfer rate determined by the device.

According to still another aspect of the present invention, a plurality of devices are provided with different machine numbers, and the switching circuit reads the transfer rate corresponding to the machine number designated by the central processing unit and compares the read transfer rate with the transfer rate determined by the channel.

According to still a further aspect of the present invention, the central processing unit is connected to a plurality of channels with different transfer rates; the device control apparatus has a plurality of circuit modules each including the channel transfer circuit and the device transfer circuit corresponding to each of the plurality of channels, and the intermediate memory is provided in common to a plurality of the circuit modules.

According to still a further aspect of the present invention, the device control apparatus is disposed between a plurality of channels of the central processing unit and a plurality of devices, the transfer rates of the channels being different from each other, and the channel transfer circuit comprises a plurality of circuits corresponding to the channels respectively, the circuit having a transfer rate determined by a channel equal to the transfer rate determined by the device establishes a synchronous transfer path directly connected to the device transfer circuit without passing through the intermediate memory, and the circuit having a transfer rate different from the transfer rate determined by the device establishes an asynchronous transfer path connected to the device transfer circuit through the intermediate memory.

BRIEF DESCRIPTION OF THE DRAWINGS

The above object and features of the present invention will be more apparent from the following description of the preferred embodiments with reference to the drawings, wherein.

DESCRIPTION OF THE PREFERRED EMBODIMENTS

Throughout the description, the same reference numerals or symbols represent the same parts.

Figure 1:
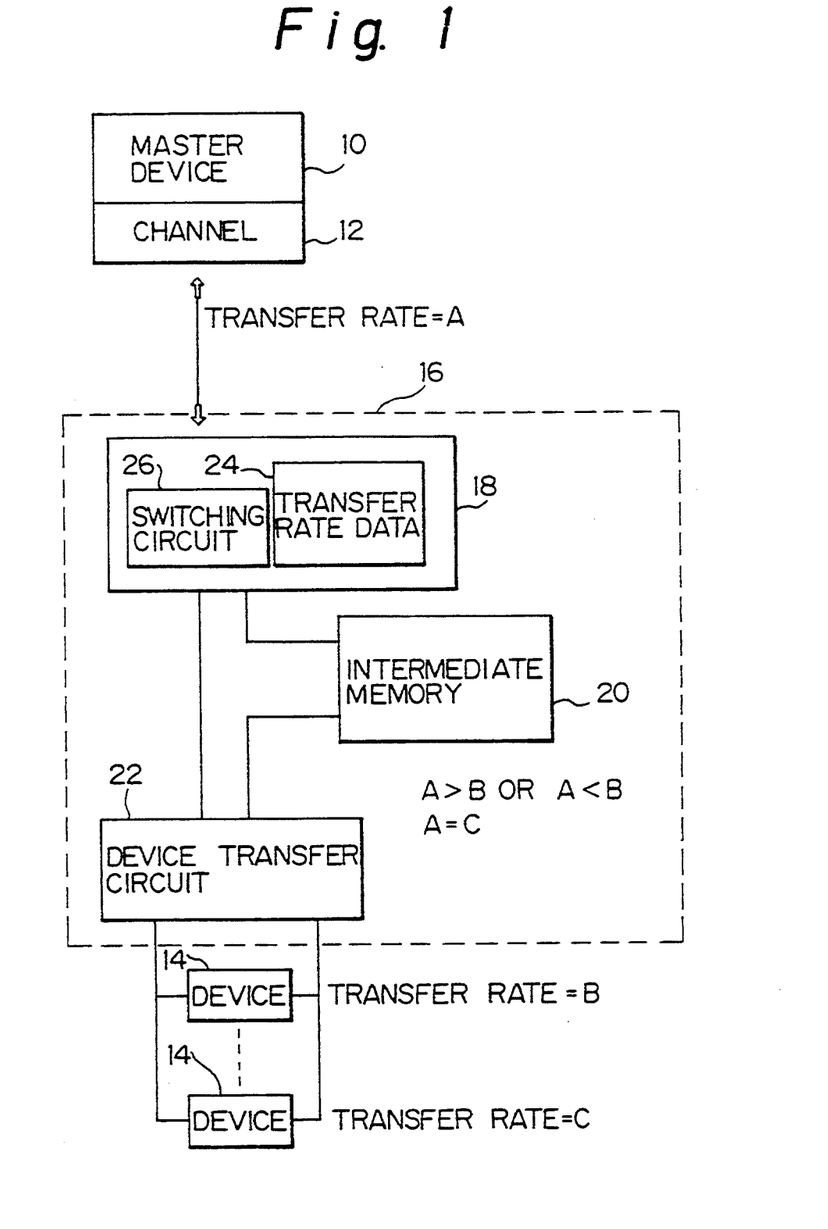
FIG. 1 is a block diagram showing the principle of a first embodiment of the present invention.

FIG. 1 is an explanatory illustration showing the principle of the first embodiment of the present application. In FIG. 1, the first embodiment of the present invention is directed to a data transfer system in a device control apparatus 16 that is disposed between a channel 12 of a master device such as a CPU 10 and devices 14 such as disk drives. The data transfer system controls data transfer between the master device 10 and the slave device 14. The data transfer system is called a device subsystem.

The device control apparatus 16 is provided with a channel transfer circuit 18 for performing data transfer to and from the channel 12; an intermediate memory (buffer memory) 20 for temporarily storing transfer data, and a device transfer circuit 22 for performing data transfer to and from a disk drive 14. The channel transfer circuit 18 is provided with an information memory 24 for storing a transfer rate A determined by the channel 12 and transfer rates B, C, ... determined by the disk drives 14. The transfer rate A determined by the channel 12 is hereinafter referred to as a channel transfer rate. The transfer rates B, C, ... determined by the disk drives 14 are hereinafter referred to as device transfer rates. The channel transfer circuit 18 further includes a switching circuit 26 that compares the channel transfer rate A and the device transfer rate B, C, ..., read out from the information memory 24 in response to a transfer request from the master device 10. When the transfer rates coincide, the switching circuit 26 selects a synchronous transfer path that does not pass through the intermediate memory 20. When the transfer rates do not coincide, the switching circuit 26 selects an asynchronous transfer path including the intermediate memory 20.

Here, the switching circuit 26 switches to the asynchronous transfer path when the channel transfer rate is higher than the device transfer rate (A>B) or when the channel transfer rate is lower than the device transfer rate (A<B).

On the other hand, when a plurality of devices 14 with different machine numbers are connected to the device control apparatus 16, device transfer rates corresponding to respective machine numbers of the devices are stored in the information memory 24, and the switching circuit 26 reads out the device transfer rate corresponding to the machine number of the device designated from the master device 10 to compare with the channel transfer rate A.

With the data transfer system in the device control apparatus 16 shown in FIG. 1, the following operation can be achieved.

When there are two devices 14 having the device transfer rate C that is the same as the channel transfer rate A of the channel 12 connected to the master device 10, and having the device transfer rate B that is different from the channel transfer rate A of the channel 12 connected to the master device 10, the information memory 24 stores the channel transfer rate A and the device transfer rates B and C of respective devices 14. When the master device 10 designates a slave device on which a reading or writing operation is to be executed, the device transfer rate corresponding to the designated device is read from the information memory 24. The read device transfer rate is compared with the channel transfer rate A.

When the result of the comparison shows a coincidence, the data from the device is directly transferred to the channel 12 without passing through the intermediate memory 20, or the data from the master device 10 is directly transferred to the disk transfer circuit 22 without passing through the intermediate memory 20. Conversely, when the result of the comparison shows a difference, a switching is performed to the data transfer path through the intermediate memory 20.

As a result, the data transfer is carried out efficiently when the devices 14 have different transfer rates and at least one of the devices 14 have a device transfer rate equal to the channel transfer rate A.

The master device 10 may be connected to a plurality of channels 12 with different transfer rates. In this case, the device control apparatus 16 has a plurality of circuit modules each including the channel transfer circuit 18 and the device transfer circuit 22 for each channel 12, and the intermediate memory 20 is provided in common to the plural circuit modules.

Figure 2:
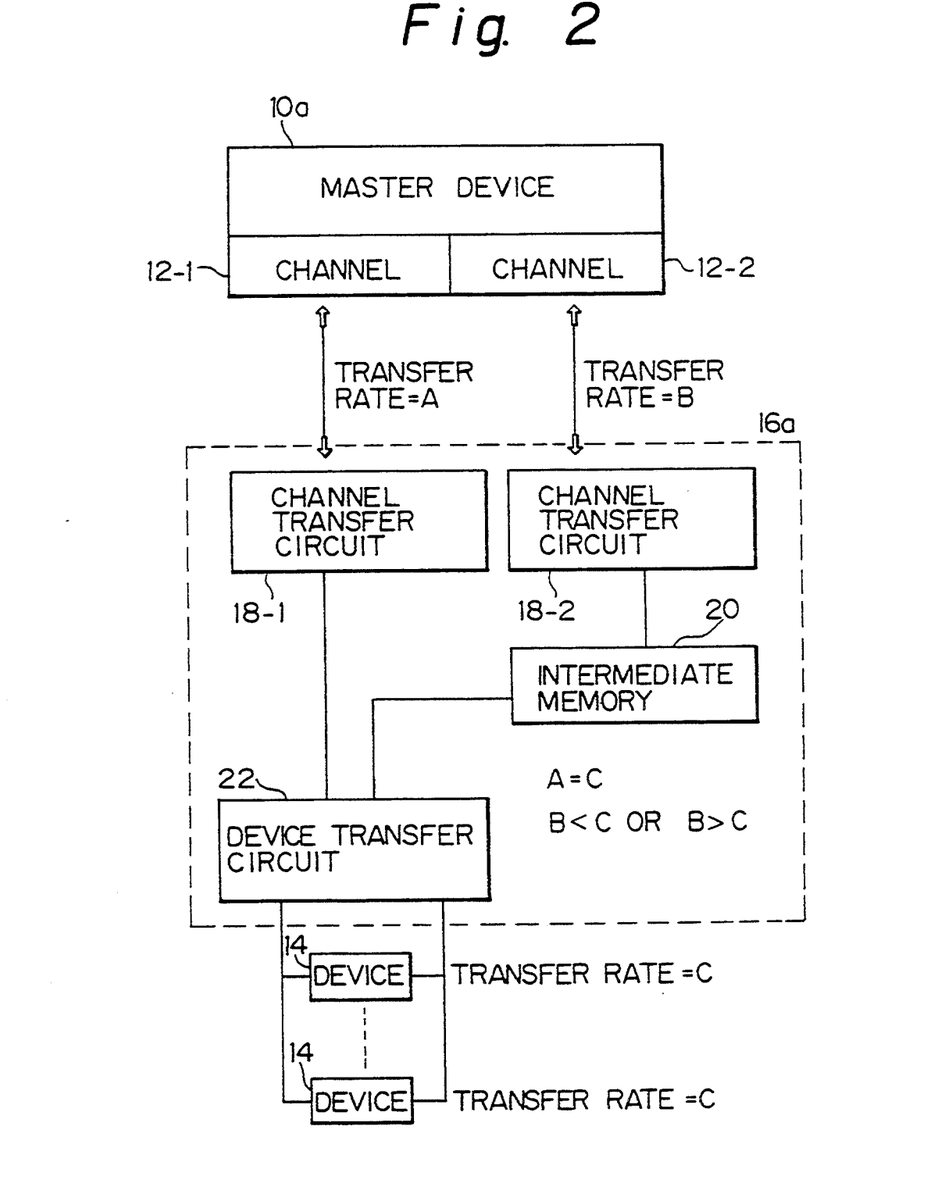
FIG. 2 is a block diagram showing the principle of a second embodiment of the present invention.

FIG. 2 is an explanatory diagram showing the principle of a second embodiment of the present invention. The same reference numerals as those in FIG. 1 represent the same parts. The difference between FIG. 1 and FIG. 2 is that, in FIG. 2, a master device 10a has two channels 12-1 and 12-2, and a device control apparatus 16a includes two channel transfer circuits 18-1 and 18-2. The channel 12-1 is connected to the channel transfer circuit 1-1, and the channel 12-2 is connected to the channel transfer circuit 18-2. The channel transfer circuit 18-2 is connected to the intermediate memory 20. The channel transfer circuit 12-1 has a channel transfer rate A that is equal to the device transfer rate C. The channel transfer circuit 12-1 establishes a synchronous transfer path directly connected to the device transfer circuit 22 without passing through the intermediate memory 20. The channel transfer circuit 12-2 has a channel transfer rate B different from the device transfer rate C. The channel transfer circuit 12-2 establishes an asynchronous transfer path connected to the device transfer circuit 22 through the intermediate memory 20.

In the operation of the second embodiment shown in FIG. 2, when the device control system 16a is connected with a plurality of channels 12-1, 12-2 having different transfer rates, the channel transfer circuit 18-2 connected to the channel 12-2 having the transfer rate B different from the transfer rate C of the device 14 under the control of the device control apparatus 16a has the transfer path via the intermediate memory 20, and the channel transfer circuit 18-1 connected to the channel 12-1 having the transfer rate A equal to the transfer rate C of the device 14 has the direct transfer path without passing through the intermediate memory 20.

Thus, by providing hardware with different transfer paths depending upon the channel to be connected, the path switching as required in the first embodiment becomes unnecessary so that the device control apparatus can be simply constructed.

Figure 3:
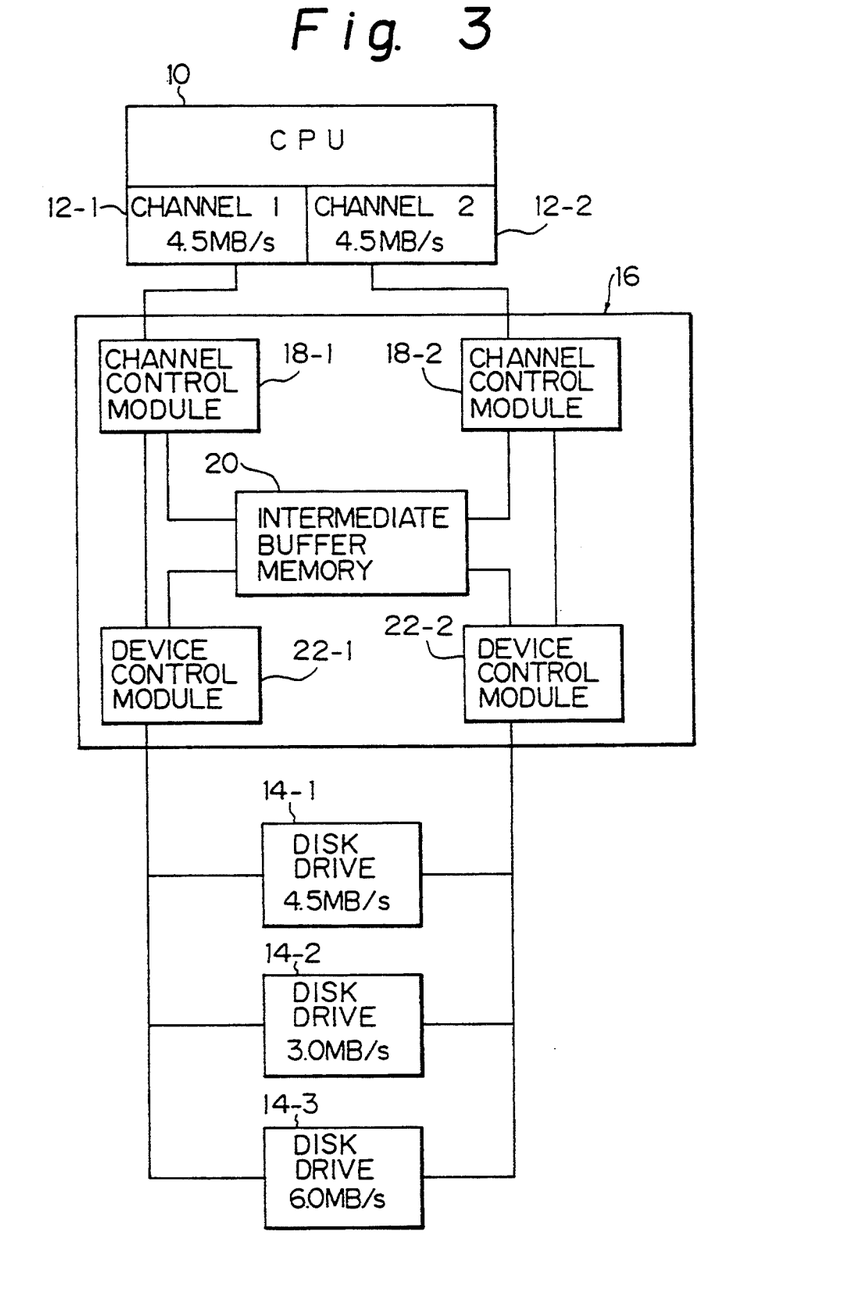
FIG. 3 is a block diagram showing the first embodiment in detail.

FIG. 3 is a block diagram showing a disk subsystem implementing the first embodiment of the present invention shown in FIG. 1.

In FIG. 3, the same reference numerals as those in FIG. 1 represent the same parts. The master device 10 is a central processing unit (CPU) in FIG. 3. The CPU 10 is connected to the two channels 12-1 and 12-2 having the same transfer rate equal to 4.5 Mega Bits/s.

To the channels 12-1 and 12-2, the disk control apparatus 16 is connected. To the disk control apparatus 16a, three disk drives 14-1, 14-2 and 14-3 are connected.

The disk drives 14-1, 14-2, 14-3 have transfer rates of 4.5 MB/s, 3.0 MB/s and 6.0 MB/s, respectively.

Namely, the transfer rate of the disk drive 14-1 is the same as the transfer rate of the channels 12-1 and 12-2, and the transfer rates of the remaining two disk drives 14-2 and 14-3 are different from the transfer rate of the channels 12-1 and 12-2.

The disk control apparatus 16 is provided with channel control modules 18-1 and 18-2 connected to the channels 12-1 and 12-2, respectively. The channel control modules 18-1 and 18-2 function as the channel transfer circuit 18 in FIG. 1.

On the other hand, for enabling access from two lines to the disk drives 14-1 to 14-3, device control modules 22-1 and 22-2, which function as the device transfer circuit 22 in FIG. 1, are provided.

Furthermore, an intermediate buffer memory 20 is disposed between channel control modules 18-1 and 18-2 and the device control modules 22-1 and 22-2.

The channel control modules 18-1 and 18-2 establish transfer paths directly connecting the disk drive 14-1 to the device control modules 22-1 and 22-2 without passing through the intermediate buffer memory 20 upon accessing the disk drive 14-1 that has the same transfer rate as the transfer rate of the channels 12-1 and 12-2.

On the other hand, when the disk drives 14-2 and 14-3 having a different transfer rate from the transfer rate of the channels 12-1 and 12-2, the transfer path is switched into the transfer path through the intermediate buffer memory 20.

Figure 4:
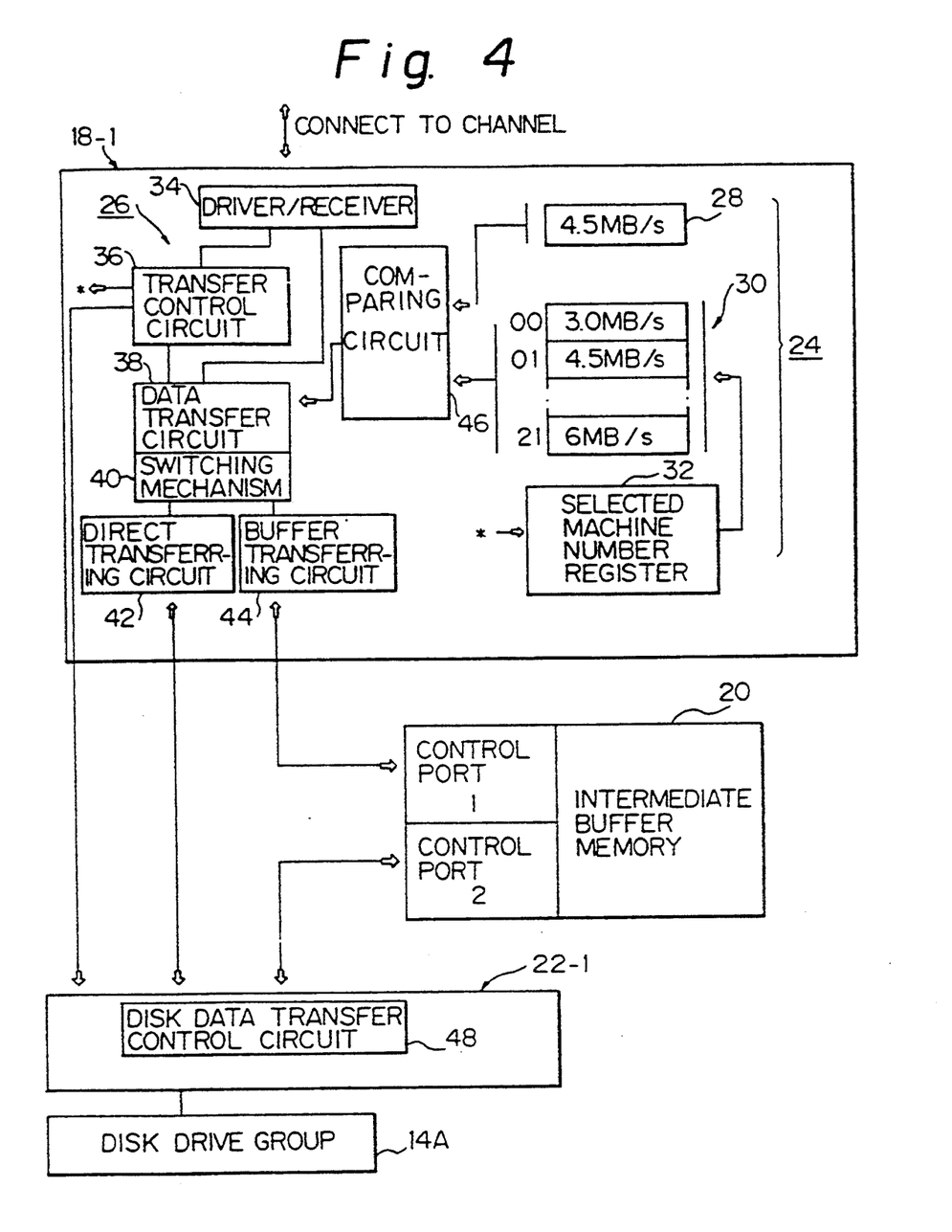
FIG. 4 is a block diagram showing a disk control apparatus in the system shown in FIG. 3.

FIG. 4 is a block diagram showing an example of the detailed construction of the channel control module 18-1 provided in the disk control apparatus 16 shown in FIG. 3. Note that the channel control module 18-2 has the same construction as the construction of the channel control module 18-1 shown in FIG. 4.

In FIG. 4, the information memory 24 and the switching circuit 26 are provided in the channel control module 18-1. The information memory 24 comprises a channel transfer rate register 28, a device transfer rate register 30 and a selected machine number register 32.

On the other hand, the switching circuit 26 comprises a driver/receiver 34, a transfer control circuit 36, a data transfer circuit 38, a switching mechanism 40, a direct transferring circuit 42, a buffer transferring circuit 44 and a comparator circuit 46.

In the channel transfer rate register 28 in the information memory 24, the channel transfer rate 4.5 MB/s is stored.

The device transfer rate register 30 stores the data transfer rates of the three disk drives 14-1 to 14-3, for example, by taking the machine number 00, 01 and 21 as addresses.

In the selected machine number register 32, the machine number of the disk drive, which is designated when it is accessed by a channel, is stored. The device transfer register 30 is accessed with the content of the selected machine number register 32 so that the corresponding device transfer rate is read out by the content of the selected machine number register 32. The read device transfer rate is input to the comparing circuit 46 in the switching circuit 26.

At the side of the switching circuit 26, when the driver/receiver 34 is activated by the channel, the driver/receiver 34 drives the transfer control circuit 36 to set the machine number of the selected device to the selected machine number register 32 in the information memory 24.

In response to the setting of the machine number to the selected machine number register 32, the device transfer rate corresponding to the set machine number is read out from the device transfer rate register 30 to the comparing circuit 46. At the same time, the channel transfer rate is read out from the channel transfer rate register 28.

The comparing circuit 46 compares the channel transfer rate and the device transfer rate read out from the information memory 24 and sends the result of the comparison to the data transfer circuit 38.

When the transfer rates are equal to each other, the data transfer circuit 38 selects a path using the direct transferring circuit 42 with the switching mechanism 40, and when the transfer rates are different from each other, the data transfer circuit 38 selects a path using the buffer transferring circuit 44.

The result of the connection of the transfer path by the data transfer circuit 38 is also imparted to the transfer control circuit 36. In response to this, the transfer control circuit 36 provides a disk data transfer control circuit 48 in the device control module 22-1 with a notice about the forthcoming data transfer to be performed through the intermediate buffer memory 20 or by a direct transfer, in advance.

Once the data transfer path is established, the data sent out from the channel is transferred to the disk data transfer control circuit 48 through the established transfer path, and, in turn, the data from the disk data transfer control circuit 48 is transferred to the channel side through the established transfer path.

It should be noted that the disk drives 14-1 to 14-3 in FIG. 3 are illustrated as a disk drive group 14A in FIG. 4.

Next, the data transfer control in the embodiment of FIGS. 3 and 4 will be described with reference to the flowchart shown in FIGS. 5 and 6.

Figure 5:
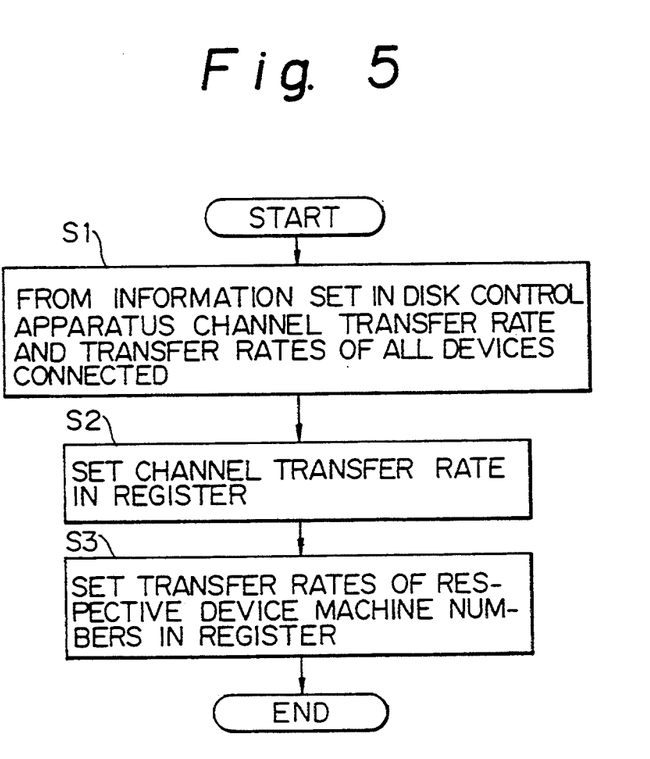
FIG. 5 is a flowchart explaining a set up process at an initial microprogram load in the embodiment shown in FIGS. 3 and 4.
Figure 6A:
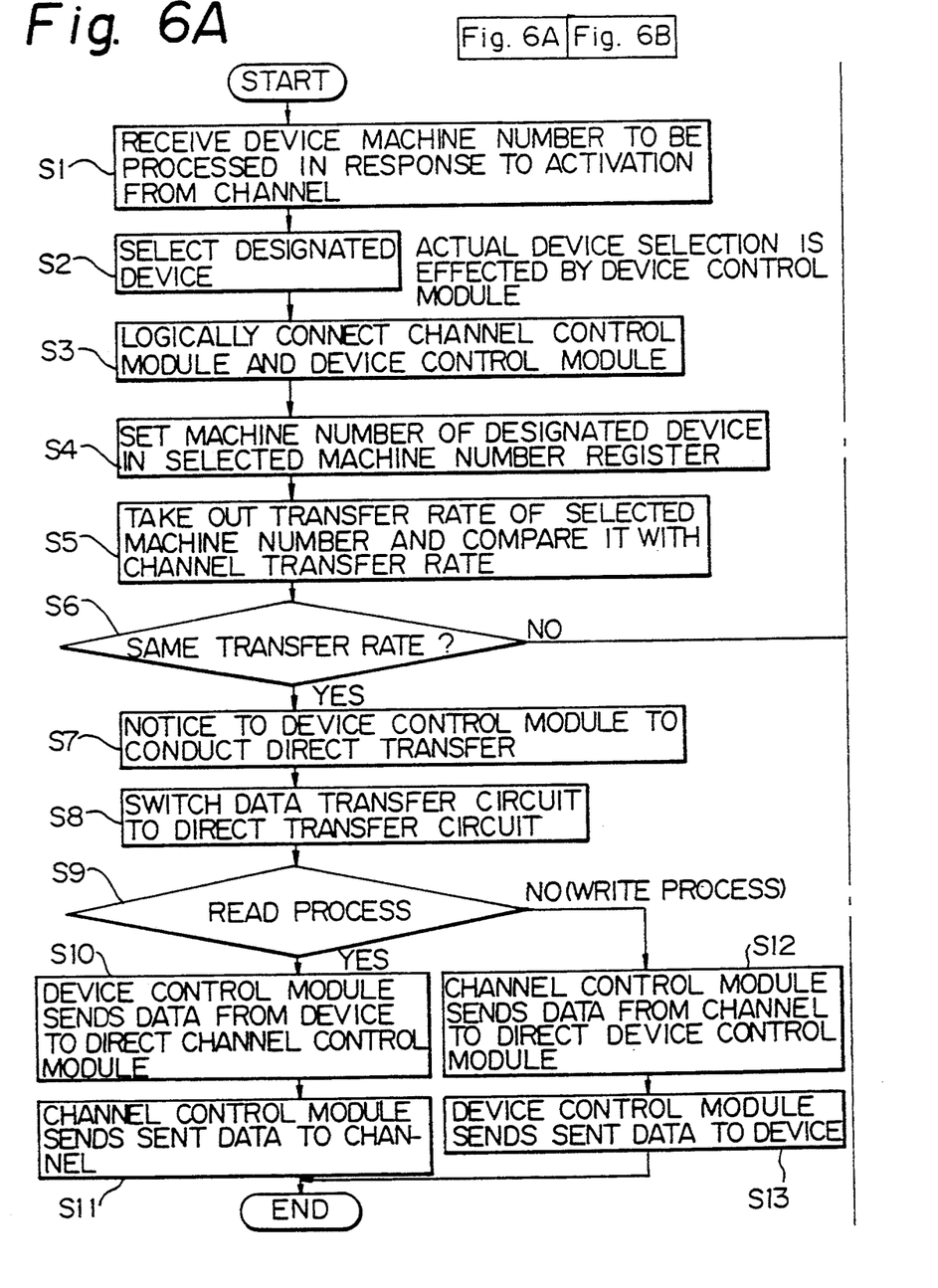
FIGS. 6A and 6B are a flowchart explaining the transfer switching process in the embodiment shown in FIGS. 3 and 4.
Figure 6B:
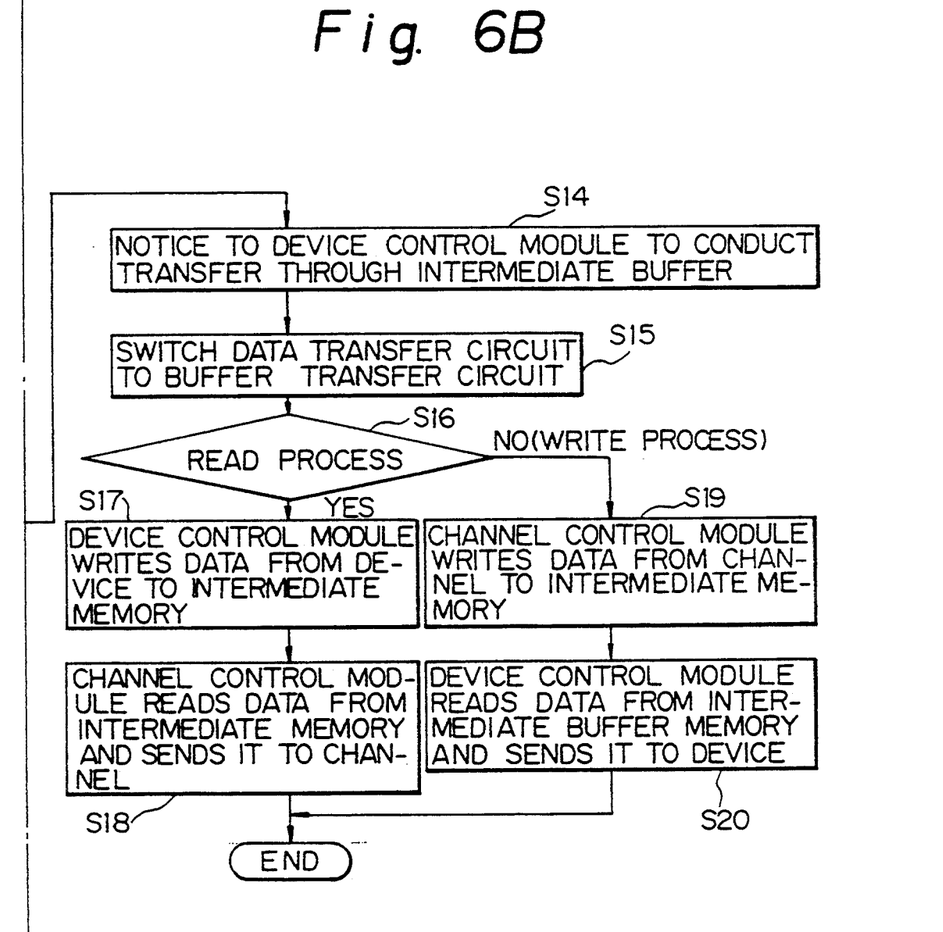

FIG. 5 is a flowchart for setting up a process at an initial microprogram load (IML). At first, at step S1, from information set in the disk control apparatus 16, the channel transfer rate and the transfer rates of all devices connected to the disk control apparatus 16 are taken out.

It should be noted that each transfer rate obtained at the step S1 is previously stored in an internal disk as constructional information in the disk control apparatus 16.

Subsequently, the process is advanced to step S2 to set the channel transfer rate in the channel transfer rate register 28 in the information memory 24. Further, the transfer rates of the devices for the respective machine numbers are set in the device transfer rate register 30 to complete the sequence of the setting up process.

Next, according to the flowchart of FIG. 6, data transfer control will be described. At first, at step S1, the driver/receiver 34 receives the machine number of the device to be processed in response to an activation from the channel. Subsequently, at step S2, selection of the designated device is performed. It should be noted that the practical device selecting operation is performed by the device control modules 22-1 and 22-2 shown in FIG. 3.

In the following description, the data transfer through the channel 12-1, the channel control module 18-1, and the device control module 22-1 is explained as an example.

Subsequently, at step S3, the channel control module 18-1 and the device control module 22-1 are logically connected. Then, at step S4, the channel control module 18-1 sets the machine number of the device designated at the step S1 in the selected machine number register 32 in FIG. 4.

Subsequently, at step S5, from the device transfer register 30 of the information memory 24, the transfer rate of the selected machine number is read out and compared, by the comparator circuit 46, with the channel transfer rate from the channel transfer register 28.

As a result of the comparison at step S6, when the transfer rates are the same, at step S7, a notice is given to the device control module 22-1 informing the same that the direct transfer is to be carried out. Then, at step S8, the data transfer circuit 38 is switched to be connected to the direct transferring circuit 42.

Through the process up to the step S8, the data transfer path directly accessing the device side without passing through the intermediate buffer memory 20 is established.

Next, at step S9, a check is performed to determine whether a reading process is required or not. If a read process is required, then the process is advanced to step S10, in which the device control module 22-1 feeds data from the disk drive, as the designated device, directly to the channel control module 18-1, and at step S11, the channel control module 18-1 feeds the receiving data to the channel 12-1.

On the other hand, when a write process is required, the process is advanced to step S12 so that the channel control module 18-1 feeds the data from the channel 12-1 directly to the device control module 22-1, and at step S13, the device control module 22-1 feeds the receiving data to the designated disk drive.

Next, when the channel transfer rate and the device transfer rate are found different at step S6, the process is advanced to step S14, in which a notice is given to the device control module 22-1 informing that the transfer is to be performed through the intermediate buffer memory 20, and at step S15, the data transfer circuit 38 is switched to be connected to the buffer transferring circuit 44.

Through the process up to the step S15, the data transfer path through the intermediate buffer memory 20 is established.

At step S16, a check is performed to determine whether a read process is required. When a read process is required, at step S17, the device control module 22-1 writes the data from the device to the intermediate buffer memory 20, and at step S18, the memory control module 18-1 reads out the data from the intermediate buffer memory 20 to feed to the channel 12-1.

On the other hand, when a requirement for write process is found in the step S16, the process is advanced to step S19, in which the channel control module 18-1 writes in the data from the channel 12-1 to the intermediate buffer memory 20, and at a step 20, the device control module 22-1 reads out the data from the intermediate buffer memory 20 to feed to the device side.

Figure 7:
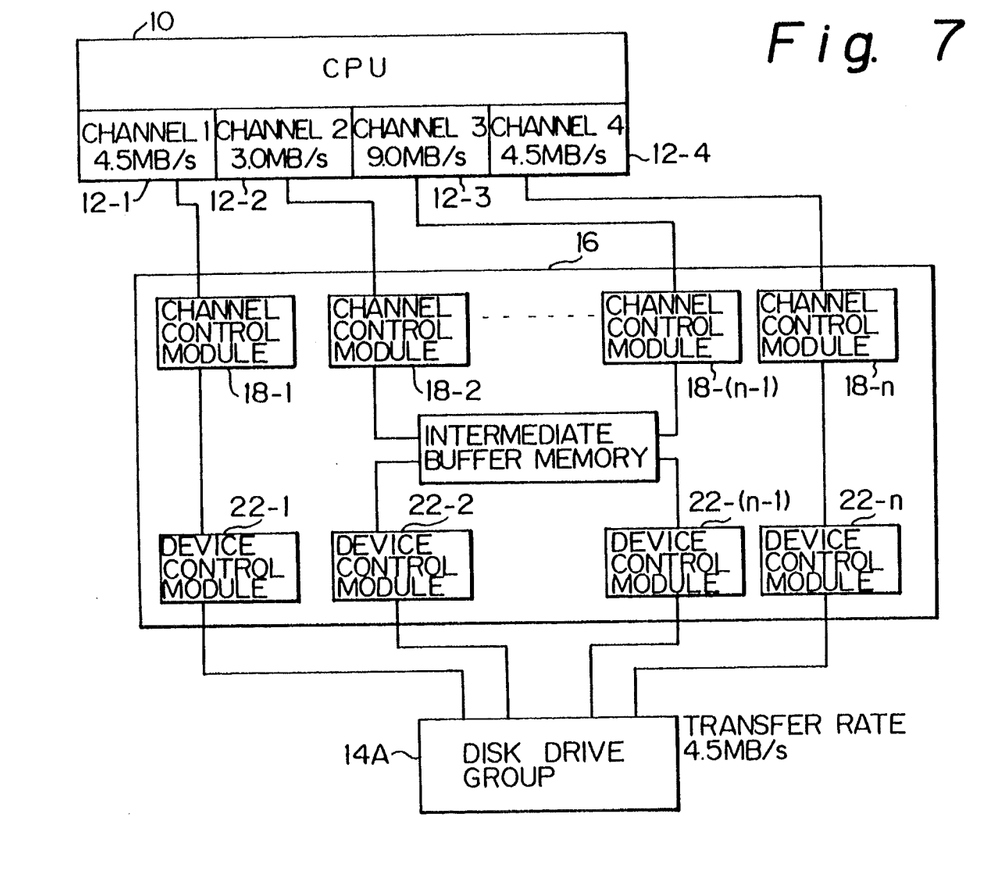
FIG. 7 is a block diagram showing the second embodiment in detail.

FIG. 7 shows the construction of the disk control apparatus 16a according to the second embodiment of the present invention.

In FIG. 7, four channels 12-1, 12-2, 12-3 and 12-4 are connected to the CPU 10 as the master device. The channel transfer rates of these channels are different, i.e., 4.5 MB/s 3.0 MB/s, 9.0 MB/s, and 4.5 MB/s, respectively.

In the disk control apparatus 16a, n number of channel control modules 18-1, 18-2, . . . , and 18-n, the number of which is greater than the number of channels in the CPU 10, are provided.

In this embodiment, the channel control modules 18-1, 18-2, 18-(n-1) and 18-n are respectively connected to the channels 12-1, 12-2, 12-3 and 12-4.

In the disk control apparatus 16a, device control modules 22-1 to 22-n corresponding to the channel control modules 18-1 to 18-n are provided.

The device control modules 22-1 to 22-n are connected to the disk drive group 14A, the disk drives constituting the disk drive group 14A have the same transfer rates of 4.5 MB/s.

In the illustrated embodiment, with respect to the channels 12-1 and 12-4 having the same transfer rate of 4.5 MB/s as the transfer rate of the disk drive group 14A, the channel control modules 18-1 and 18-n are directly connected to the device control modules 22-1 and 22-n without passing through the intermediate buffer memory 20 provided in the disk control apparatus 16a.

In contrast to this, for the channels 12-2 and 12-3 having transfer rates different from the transfer rate (4.5 MB/s) of the disk drive group 14A, the corresponding channel control modules 18-2 and 18-(n-1) in the disk control apparatus 16a are connected to the device control modules 22-2 and 22-(n-1) through the intermediate buffer memory 20.

Figure 8A:
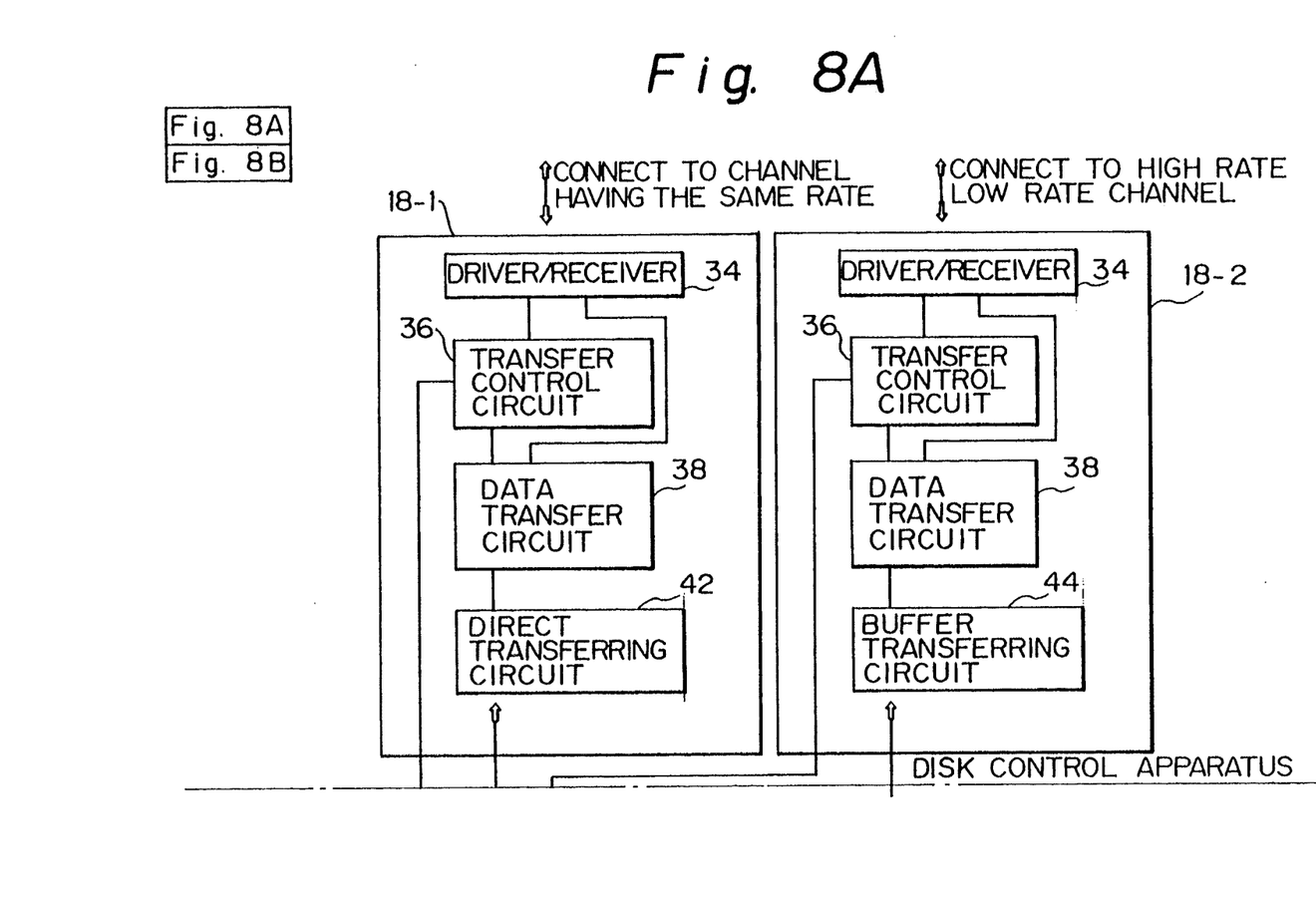
FIGS. 8A and 8B are a block diagram showing the disk control apparatus in the system shown in FIG. 7.
Figure 8B:
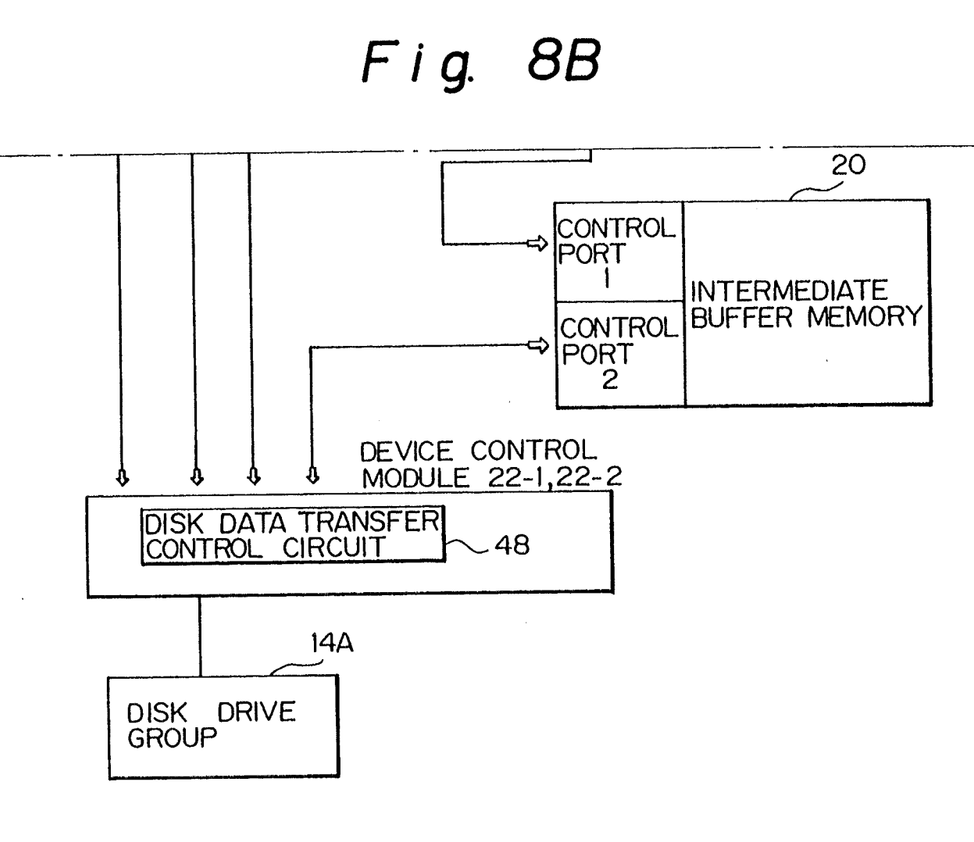

FIG. 8 is a block diagram showing the construction of the practical embodiment of the channel control modules 18-1 and 18-2 in the disk control apparatus 16a.

In FIG. 8, the channel control module 18-1 connected to the device control module 22-1 without passing through the intermediate buffer memory 20 is provided with the driver receiver 34, the transfer control circuit 36, the data transfer circuit 38 and the direct transferring circuit 42.

On the other hand, the channel control module 18-2 connected to the device control module 22-2 through the intermediate buffer memory 20 is provided with the driver receiver 34, the transfer control circuit 36, the data transfer circuit 38 and the buffer transferring circuit 44. The buffer transferring circuit 44 is connected to the control port 1 side of the intermediate buffer memory 20. The control port 2 side of the intermediate buffer memory 20 is connected to the device control module 22-2.

It should be noted, in the embodiment of FIG. 8, although the device control modules 22-1 and 22-2 are illustrated in a single block for simplification of explanation, the separated device control modules 22-1 and 22-2 are practically provided as shown in FIG. 7.

In the embodiment shown in FIGS. 7 and 8, when the channel transfer rate and the device transfer rate are the same, the data transfer path not passing through the intermediate buffer memory 20 is fixedly established; and, when the channel transfer rate and the device transfer rate are different from each other, the data transfer path through the intermediate buffer memory is fixedly established.

Therefore, the information memory 24, the comparator 46 and the switching mechanism, 40 for switching the data transfer path as illustrated in FIG. 4 becomes unnecessary, and the optimum disk sub-system can be constructed with a simple construction by providing the channel control modules for direct transfer and the channel control modules for transferring through the buffer.

Figure 9:
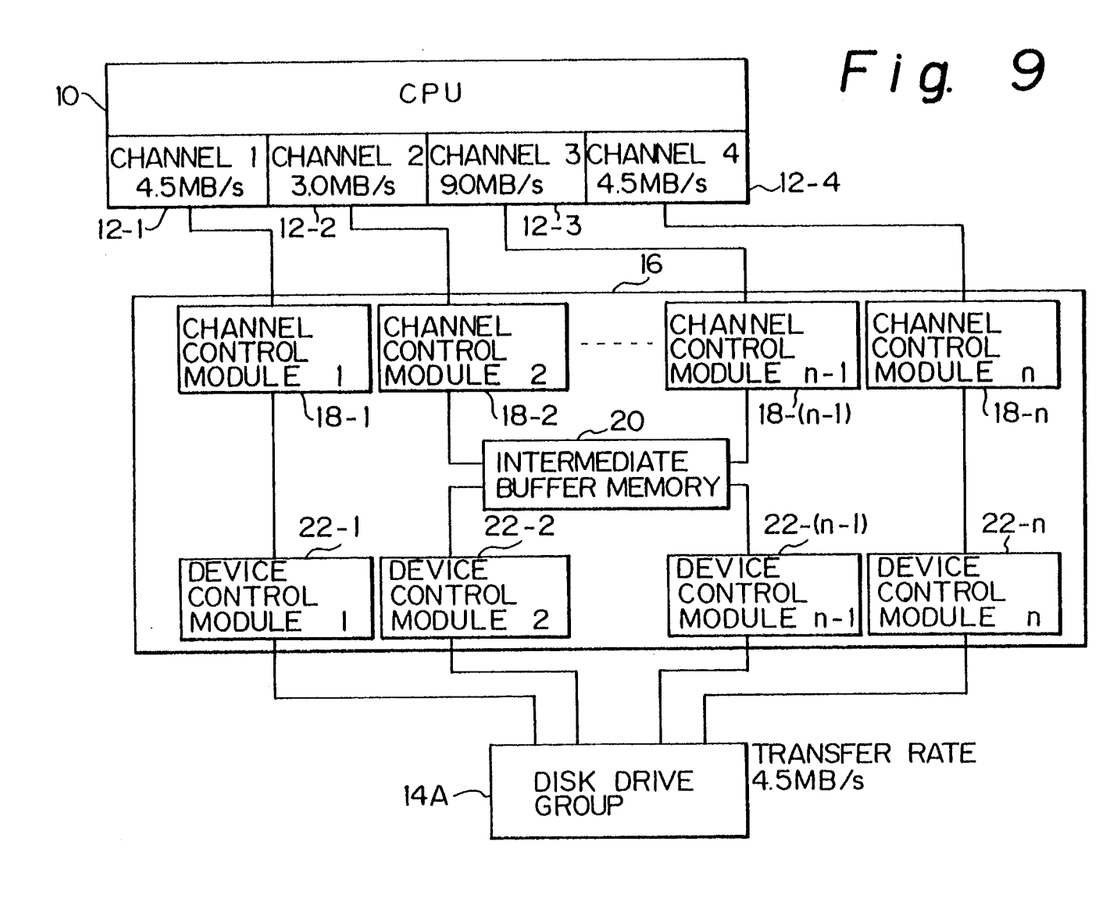
FIG. 9 is a block diagram showing another example of the first embodiment of the present invention.

FIG. 9 is a block diagram showing another example of the first embodiment of the present invention. In the embodiment of FIG. 3, a plurality of the channels having the same transfer rates are provided in the CPU 10. By contrast, the example shown in FIG. 9 is differentiated by providing the channels 12-1, 12-2, 12-3, and 12-4 having different transfer rates of 4.5 MB/s, 3.0 MB/s, 9.0 MB/s, and 4.5 MB/s. In this case, similar to the embodiment of FIGS. 3 and 4, when the channel transfer rate and the device transfer rate are the same, the path is switched for direct transfer without passing through the intermediate buffer memory 20, and when they are different, a path is switched for transferring through the intermediate buffer memory 20. Thus an effective data transfer can also be achieved by the construction shown in FIG. 9.

Figure 10A:
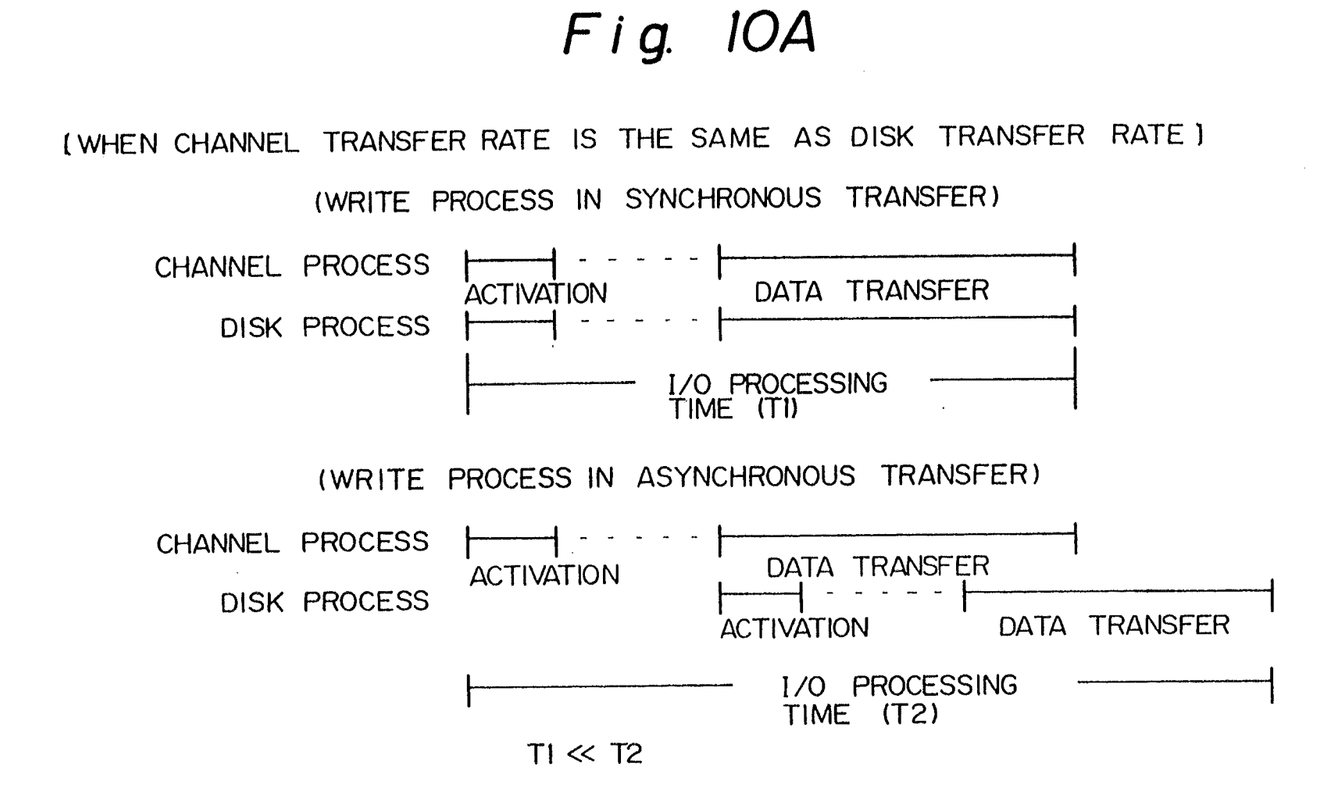
FIG. 10A is a time chart showing a comparison of the processing times of the synchronous transfer process and the asynchronous transfer process when the channel transfer rate and the device transfer rate are the same.

FIG. 10A is a time chart showing a comparison of the processing times of the synchronous transfer process, which is the direct transfer process without passing through the intermediate memory 20, and the asynchronous transfer process, which is the indirect transfer passing through the intermediate memory 20, when the channel transfer rate and the device transfer rate are the same. As shown in FIG. 10A, when the channel transfer rate and the device transfer rate are the same, the I/O processing time in the synchronous transfer process is shorter than the I/O processing time in the asynchronous transfer process.

Figure 10B:
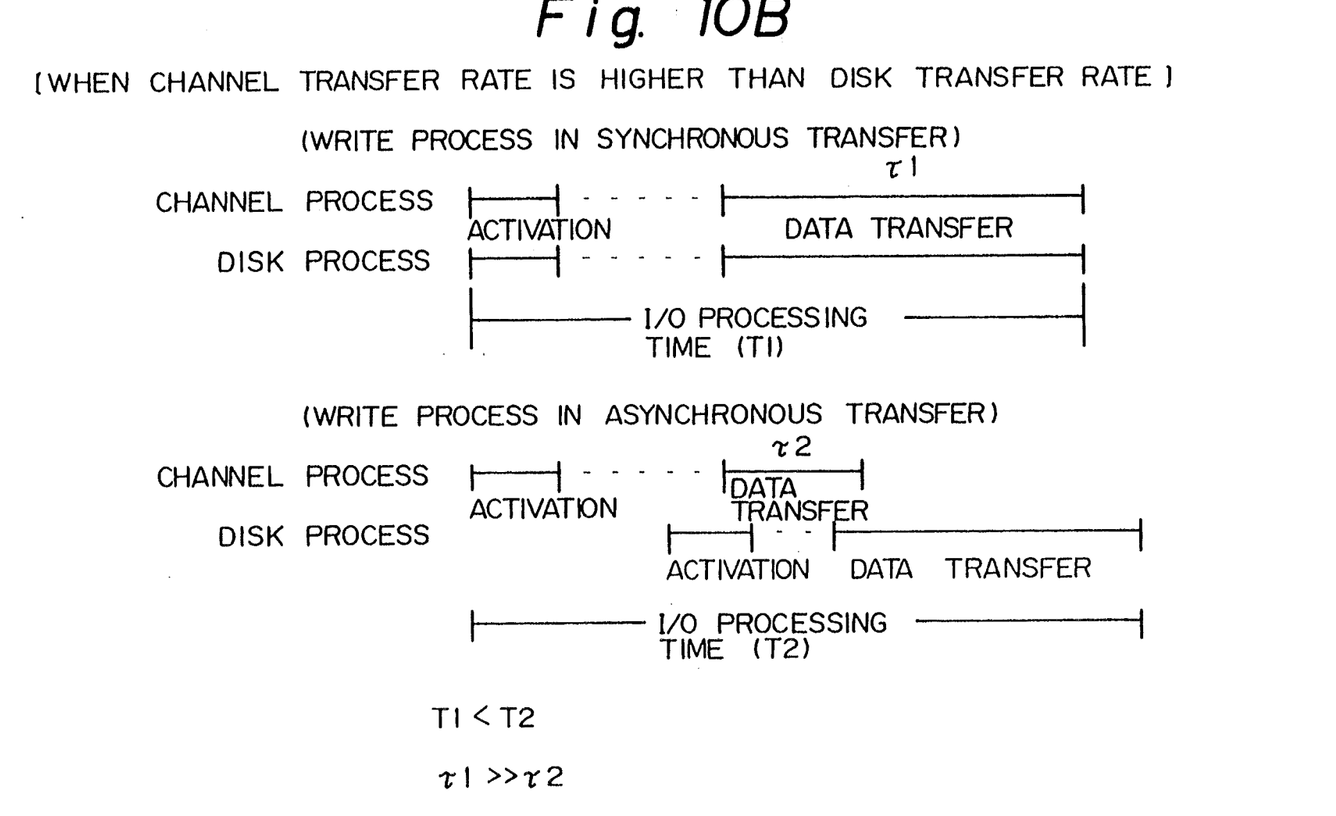
FIG. 10B is a time chart showing a comparison of the processing times of the synchronous transfer process and the asynchronous transfer process when the channel transfer rate is higher than the device transfer rate.

FIG. 10B is a time chart showing a comparison of the processing times of the synchronous transfer process and the asynchronous transfer process when the channel transfer rate is higher than the device transfer rate. In this case, the asynchronous transfer has a shorter occupying time of the channel in comparison with the synchronous transfer and thus provides more efficient use of the channel. Therefore, although the time for completing one process is slightly longer, the asynchronous transfer is more effective as a sub-system because the use rate of the channel is high.

When the channel transfer rate is lower than the disk transfer rate, since the data transfer rate of the disk is fixed and therefore the direct transfer is naturally impossible and only a transfer via the buffer can be realized.

It should be noted that although the foregoing embodiments are exemplary applications, the present invention should not be limited to these and is applicable to sub-systems of various devices.

As set forth above, according to the present invention, the optimum disk sub-system with high data transfer efficiency can be constructed by allowing free switching between the synchronous transfer without passing through the intermediate buffer memory and the asynchronous transfer through the intermediate buffer memory depending upon a combination of the channel transfer rate and the device transfer rates.

Also, when the transfer rates of channels connected to a disk drive having a constant transfer rate are different, an optimum disk sub-system with a simple construction and high data transfer efficiency can be constructed according to the present invention by providing a circuit module for the synchronous transfer and a circuit module for the asynchronous transfer, and by freely combining the two types of circuit modules depending upon the relationship of the transfer rates between the disk and the channel.

What is claimed is:

1. A data transfer system for controlling data transfer between a channel of a central processing unit and a storage device, said channel having a first transfer rate, and said storage device having a second transfer rate, said system comprising:

a channel transfer circuit for controlling the data transfer between said channel and said channel transfer circuit at the first transfer rate;

a device transfer circuit for controlling data transfer between said device and said device transfer circuit at the second transfer rate;

a first path for synchronously transferring data between said channel transfer circuit and said device transfer circuit;

an intermediate memory, connected through a second path to said channel transfer circuit, and said device transfer circuit for temporarily storing transfer data from said channel transfer circuit and asynchronously transferring the transfer data to said device transfer circuit, and for temporarily storing the transfer data from said device transfer circuit and asynchronously transferring the transfer data to said channel transfer circuit;

said channel transfer circuit including a memory for storing data representing the first transfer rate and data representing the second transfer rate;

comparing means, connected to said memory, for comparing the first transfer rate and the second transfer rate; and switching means, for selecting one of the first path or the second path based on a result of said comparing means.

2. A data transfer system as claimed in claim 1 wherein said comparing means compares data representing said first and second transfer rates from said memory in response to a transfer request from said central processing unit and said switching means selects the first path when said first transfer rate is equal to said second transfer rate, and said switching means selects the second path when said first transfer rate is different from said second transfer rate.

3. A data transfer system as claimed in claim 1 wherein said storage device comprises a group of disk drives, each disk drive having said second transfer rate.

* * * * *